United States Patent
Jang et al.

(10) Patent No.: US 6,586,542 B2
(45) Date of Patent: Jul. 1, 2003

(54) PROCESS FOR CONTROLLING DEGREE OF BRANCH OF HIGH 1,4-CIS POLYBUTADIENE

(75) Inventors: Young-Chan Jang, Taejeon (KR); Pil-Sung Kim, Taejeon (KR); Gwang-Hoon Kwag, Taejeon (KR); A-Ju Kim, Taejeon (KR); Seung-Hwon Lee, Taejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 169 days.

(21) Appl. No.: 09/817,997

(22) Filed: Mar. 27, 2001

(65) Prior Publication Data

US 2002/0016423 A1 Feb. 7, 2002

(30) Foreign Application Priority Data

Jul. 6, 2000 (KR) .............................. 00-38500

(51) Int. Cl.$^7$ ............................... C08F 4/70; C08F 4/50
(52) U.S. Cl. .................... 526/117; 526/133; 526/169.1; 526/335; 502/113; 502/119; 502/170
(58) Field of Search ................................ 526/117, 133, 526/169.1, 335

(56) References Cited

U.S. PATENT DOCUMENTS

| | | |
|---|---|---|
| 3,464,965 A | 9/1969 | Yasunaga et al. |
| 3,483,177 A | 12/1969 | Throckmorton et al. |
| 3,528,957 A | 9/1970 | Throckmorton et al. |
| 4,533,711 A | 8/1985 | Takeuchi et al. |
| 5,100,982 A | 3/1992 | Castner |
| 5,451,646 A | 9/1995 | Castner |

FOREIGN PATENT DOCUMENTS

| | | |
|---|---|---|
| EP | 093075 B1 | 2/1983 |
| JP | 53051286 | 5/1978 |
| JP | 093075 A2 | 2/1983 |

*Primary Examiner*—Caixia Lu
(74) *Attorney, Agent, or Firm*—Davidson, Davidson & Kappel, LLC

(57) ABSTRACT

Disclosed is a process of controlling the degree of branch of high 1,4-cis polybutadiene without any alternation in the 1,4-cis content and the polymerization yield, in which a dialkylzinc compound represented by the following formula I is added in a controlled amount as an agent for controlling the degree of branch of high 1,4-cis polybutadiene, thus guaranteeing the optimum processability and physical properties of polymer according to the use purpose.

$$R_1-Zn-R_2 \quad \text{Formula I}$$

wherein $R_1$ and $R_2$ are same or different and include an alkyl group containing 1 to 5 carbon atoms.

8 Claims, No Drawings

PROCESS FOR CONTROLLING DEGREE OF BRANCH OF HIGH 1,4-CIS POLYBUTADIENE

TECHNICAL FIELD

The present invention generally relates to a process for controlling the degree of branch of high 1,4-cis polybutadiene, and more particularly to a process of easily controlling the degree of branch of polybutadiene which is concerned directly with physical properties of polymer such as processability or strength, in which process the high 1,4-cis polybutadiene is prepared via polymerization of 1,3-butadiene in the presence of the Ziegler-Natta catalyst by adding a dialkylzinc compound as an agent for controlling the degree of branch, and controlling the degree of branch of polybutadiene based on the content of the dialkylzinc compound without any alternation in the 1,4-cis content or polymerization yield.

BACKGROUND ART

According to the conventional method of controlling the degree of branch of high 1,4-cis polybutadiene (hereinafter, referred to as "high-cis BR"), European Patent. No. 093,075 discloses a method of using organo-nickel compound, organo-aluminum compound and hydrogen fluoride as a main catalyst and controlling the degree of branch of high-cis BR based on the content of organo-nickel compound and the variation of the polymerization temperature.

U.S. Pat. No. 3,528,957 and U.S. Pat. No. 3,483,177 also disclose a method of using organo-nickel compound, organo-aluminum compound and boron trifluoride ($BF_3$) compound as a main catalyst and controlling the solution viscosity of high-cis BR based on the type and content of the catalyst, thus improving processability and physical properties of polymer. This method is based on the fact that the degree of branch decreases with an increase in the solution viscosity at a constant Mooney viscosity.

Furthermore, U.S. Pat. No. 3,464,965 discloses a method for controlling the cold flow tendency of high-cis BR which is closely concerned with processability and workability. This method is based on the fact that the cold flow tendency of the high-cis BR decreases with an increase in the degree of branch. More specifically, the method involves adding organo-nickel compound, organo-aluminum compound and boron trifluoride ($BF_3$) compound as a polymerization catalyst for polybutadiene and varying the content of the diene compound added to the organo-nickel compound prior to the polymerization reaction to control the degree of branch of the high-cis BR.

The solution viscosity and the Mooney viscosity of high-cis BR are greatly dependent upon the molecular weight, i.e., they increase with an increase in the molecular weight of high-cis BR. Many methods of controlling the molecular weight to improve processability and physical properties of the high-cis BR have been suggested. For example, U.S. Pat. No. 5,100,982 discloses a method of using organo-nickel compound, organo-aluminum compound and boron trifluoride ($BF_3$) compound as a main catalyst, together with halogen-substituted phenol derivative as an additive to control the molecular weight and the molecular weight distribution of the high-cis BR.

U.S. Pat. No. 5,451,646 also discloses a method of using organo-nickel compound, organo-aluminum compound and fluorine-containing compound as a main catalyst, together with p-styrenated diphenyl amine to control the molecular weight of the high-cis BR, thereby improving the processability.

Further, Japanese Application No. 51-127030 discloses a method of preparing the high-cis BR with a narrow range of molecular weight distribution using nickel compound, boron compound, alkyllithium and alkylbenzene sulfonate.

In addition, U.S. Pat. No. 4,533,711 discloses a method of further extending the molecular weight distribution, wherein rare earth metal compound belonging to the atomic number of 57 to 71, organo-aluminum compound and halogenated aluminum compound were employed as a main catalyst, while using organo-aluminum hydride or hydrocarbon compound containing activated hydrogen as a controller of molecular weight.

However, the conventional methods of controlling the degree of branch and the molecular weight distribution in preparing the high-cis BR are problematic in that the polymerization yield and the 1,4-cis content are lowered with great complexity in the process for industrial production.

Typically, the degree of branch together with the average molecular weight and the molecular weight distribution is directly concerned with the processability and physical properties of polymer, which depends on the ratio of solution viscosity to Mooney viscosity. That is, the linearity of polymer increases with reduced degree of branch as the ratio of solution viscosity to Mooney viscosity increases.

Generally, a polymer of a low degree of branch, i.e., high linearity has an increase in the cold flow tendency and thereby results in a deterioration of processability and working performance in carriage and storage. Otherwise, a polymer of a high degree of branch is improved in working performance due to reduced cold flow tendency but deteriorated in physical properties.

Considering the above-mentioned problems, there is a need for rubbers having a low molecular weight and a considerably high degree of branch in the manufacture of tires with improved processability, and rubbers having a high molecular weight and a low degree of branch in the manufacture of tires with excellent physical properties such as high impact resistance and high tensile strength.

DISCLOSURE OF INVENTION

It is an object of the present invention to overcome the problem in regard to the control of degree of branch involved in the conventional methods of preparing high-cis BR and to provide a process of controlling the degree of branch of high-cis BR, in which a dialkylzinc compound is added in a controlled amount to readily control the degree of branch of the high-cis BR based on the content of the dialkylzinc compound without any alternation of 1,4-cis content or polymerization yield, thus optimizing the processability and physical properties of rubber.

To achieve the above object of the present invention, there is provided a process for controlling the degree of branch of high-cis BR using a catalyst prepared by aging a mixture of organo-nickel compound, boron trifluoride ($BF_3$) compound and organo-aluminum compound, the process being characterized in that a dialkylzinc compound represented by the following formula I is added to the mixture as an agent for controlling the degree of branch.

$$R_1\text{—Zn—}R_2 \qquad \text{Formula I.}$$

wherein $R_1$ and $R_2$ are same or different and include an alkyl group containing 1 to 5 carbon atoms.

Now, the present invention will be described in further detail as set forth hereunder.

The present invention relates to a process for controlling the degree of branch that may affect the processability and physical properties of rubbers, in which a dialkylzinc compound is added to regulate the catalyst activity and thereby to readily control the degree of branch of 1,4-cis BR without any alternation of polymerization yield or 1,4-cis content.

The dialkylzinc compound used as an agent for controlling the degree of branch of high-cis BR in the present invention is required to have a high solubility in a non-polar solvent used as a polymerization solvent, and preferably a compound containing 1 to 5 carbon atoms as represented by the formula I. More specifically, the examples of the dialkylzinc compound include dimethylzinc, diethylzinc, dipropylzinc, diisopropylzinc, dibutylzinc, diisobutylzinc and dipentylzinc.

According to the present invention, when the sum of the concentrations of dialkylzinc compound and organo-aluminum compound is constant, it is possible to obtain a 1,4-cis BR having a high degree of branch, which may be represented by a low ratio of solution viscosity to Mooney viscosity with an increase in the concentration of the dialkylzinc compound.

Preferably, the amount of the dialkylzinc compound per 1 mole of nickel catalyst is in a molar ratio of 0.5 to 10. If the molar ratio of such amount is less than 0.5 per 1 mole of nickel catalyst, the effect of controlling the degree of branch is reduced. But, in case of exceeding the molar ratio of 10, the catalyst is susceptible to over-reduction during aging to produce precipitation so that accurate weighing of the catalyst is impossible or the high 1,4-cis BR thus obtained becomes discolored.

As for the organo-nickel compounds of the catalyst, carboxylic compounds having a ligand very soluble in non-polar solvents are preferable; for example, such compounds include nickel hexanoate, nickel heptanoate, nickel octanoate, nickel 2-ethylhexanoate, nickel naphthenate, nickel versatate or nickel stearate, preferably containing at least 6 carbon atoms.

The boron trifluoride ($BF_3$) compound is a complex of an ether compound, the examples of which include dimethyl ether, diethyl ether, dibutyl ether, tetrahydrofuran, dihexyl ether, dioctyl ether, and methyl t-butyl ether.

The organo-aluminum compound is commonly available and includes, for example, trimethylaluminum, triethylaluminum, tripropylaluminum, tributylaluminum, triisobutylaluminum, trihexylaluminum, trioctylaluminum, or diisobutylaluminum hydride.

In line with the process of aging Ziegler-Natta catalyst, it is prerequisite that the solvents designed to prepare the catalyst be those that have no reactivity with the catalyst; for examples, cyclohexane, hexane, heptane, and toluene are preferred.

It is preferable that the mixing ratio of each catalyst in Ziegler-Natta catalyst is determined as follows: the molar ratio of organo-aluminum compound to nickel compound (Al:Ni) is 1:1 to 20:1; the molar ratio of boron trifluoride complex to organo-aluminum compound is 0.7:1 to 20:1; the molar ratio of boron trifluoride complex to nickel compound is 1:1 to 30:1.

The sequential input order of each catalyst for the aging of a desired catalyst is as follows: a light-green colored nickel catalyst solution (in cyclohexane) containing 1,3-butadiene is charged to a catalyst reactor under the nitrogen atmosphere and then, boron trifluoride complex, organo-aluminum compound and dialkylzinc compound represented by the formula I are introduced.

Since the sequential input order of each catalyst significantly affects the nature of the high-cis BR as a final product, extreme caution should be exercised in observing such sequential input order.

Meanwhile, the temperature and time related to aging of the catalyst also affect the nature of the high-cis BR as a final product; the appropriate aging time ranges from 5 minutes to 2 hours, while the aging temperature is preferably in the range of −20 to 60° C.

Then, a mixture of 1,3-butadiene and Ziegler-Natta catalyst is mixed with a polymerization solvent to initiate polymerization. Since the polymerization solvent affects the polymerization, its use should be made in the state where oxygen and water are removed.

Preferably, polymerization solvents suitable for the present invention include non-polar solvents, such as cyclohexane, heptane, hexane, benzene, and toluene.

The polymerization is preferably initiated under a high-purity nitrogen atmosphere in the reaction temperature range from room temperature to 100° C. for 2 hours in the presence of an appropriate catalyst to attain the desired product with a yield of at least 90%.

After the reaction is completed, a reaction terminator (e.g., polyoxyethyleneglycol ether organo-phosphate) and 2,6-di-t-butyl-p-cresol are added to the reaction mixture, followed by precipitation in methyl alcohol or ethyl alcohol to obtain the final product.

The degree of branch of high-cis BR thus obtained is represented by a ratio of solution viscosity (SV) to Mooney viscosity (MV), i.e., SV/MV. The solution viscosity is measured at 25° C. with an Ubbelohde viscometer, the Mooney viscosity being measured with a Mooney viscometer (Model No. SMV-201) from Shimadzu Co., Ltd.

The present invention will be explained based on the following examples in more detail as set forth hereunder but is not limited by these examples.

Best Mode for Carrying out the Invention

EXAMPLE 1

A Ziegler-Natta catalyst as used herein was prepared by mixing nickel naphthenate of 0.05% solution in cyclohexane, boron trifluoride dibutylether of 1.5% solution in cyclohexane, and triethylaluminum of 0.8% solution in cyclohexane, and adding diethylzinc as an agent for controlling the degree of branch, followed by aging.

The reaction catalyst was aged in such a manner that (a) an 100 ml round-bottomed flask was sufficiently purged with nitrogen and was sealed tightly with rubber stopper, and (b) nickel naphthenate, boron trifluoride dibutylether, triethylaluminum and diethylzinc were sequentially charged to the flask in a molar ratio of 1:14:5:1, which was then aged at 20° C. for 1 hour prior to use.

The polymerization was performed in such a manner that (a) a 360 ml pressure reactor was sufficiently filled with nitrogen, and (b) a polymerization solvent, as prepared by mixing cyclohexane and heptane in a ratio of 9:1 by weight, the above-aged Ziegler-Natta catalyst, and 1,3-butadiene monomer were added to the reactor and reacted at 40° C. for 2 hours.

The ratio of polymerization solvent to monomer was 4.5, and 2,6-di-t-butyl-p-cresol, polyoxyethyleneglycol ether organo-phosphate and ethanol were added to the reaction mixture to complete the reaction.

EXAMPLES 2 TO 7

The same procedures were performed as described in Example 1 to produce high-cis BR, excepting that the type and composition of the catalyst were selected as shown in Table 1.

TABLE 1

| | Catalyst Composition[1] | Catalyst Mole Ratio | SV/MV | SV (cps) | MV ($M_{1+4}$, 100° C.) | 1,4-cis Content (%) | Yield (%, 2 h) |
|---|---|---|---|---|---|---|---|
| 1 | Ni(naph)2/ | 1:14:5:1 | 8.78 | 332 | 37.8 | 97.8 | 100 |
| 2 | $BF_3OBu_2$/ | 1:14:4:2 | 4.19 | 153 | 36.5 | 97.5 | 100 |
| 3 | $AlEt_3$/ | 1:14:3:3 | 3.48 | 113 | 32.5 | 97.6 | 100 |
| 4 | $Et_2Zn$ | 1:14:2:4 | 2.76 | 54 | 19.6 | 97.5 | 100 |
| 5 | | 1:14:1:5 | 2.72 | 50 | 18.4 | 97.4 | 100 |
| 6 | Ni(2-eth)$_2$/ $BF_3OEt_2$/ $AlEt_3$/ $Et_2Zn$ | 1:14:2:4 | 3.38 | 51 | 15.1 | 96.7 | 100 |
| 7 | Ni(str)$_2$/ $BF_3OEt_2$/ $AlEt_3$/ $Et_2Zn$ | 1:14:2:4 | 3.44 | 55 | 16.0 | 97.1 | 100 |

(Note)
[1]Ni(naph)$_2$: Ni(naphthenate)$_2$
Ni(2-eth)$_2$: Ni(2-ethylhexanoate)$_2$
Ni(str)$_2$: Ni(stearate)$_2$
Ni catalyst: $1.0 \times 10^{-4}$ mol/100 g (1,3-butadiene); Examples 1 to 5
Ni catalyst: $1.5 \times 10^{-4}$ mol/100 g (1,3-butadiene); Examples 6 and 7

EXAMPLES 8, 9 AND 10

The same procedures were performed as described in Example 1 to produce high-cis BR, excepting that dimethylzinc was used as the agent for controlling the degree of branch. The results are presented in Table 2.

TABLE 2

| | Catalyst Composition[1] | Catalyst Mole Ratio | SV/MV | SV (cps) | MV ($M_{1+4}$, 100° C.) | 1,4-cis Content (%) | Yield (%, 2 h) |
|---|---|---|---|---|---|---|---|
| 8 | Ni(naph)$_2$/ | 1:14:5:1 | 6.69 | 206 | 30.8 | 97.0 | 100 |
| 9 | $BF_3OBu_2$/ | 1:14:4:2 | 6.00 | 180 | 30.0 | 97.3 | 94 |
| 10 | $AlEt_3$/ $ZnMe_2$ | 1:14:3:3 | 5.04 | 130 | 25.8 | 97.5 | 90 |

(Note)
[1]Ni(naph)$_2$: Ni(naphthenate)$_2$
Ni catalyst: $1.5 \times 10^{-4}$ mol/100 g (1,3-butadiene); Examples 8, 9 and 10

COMPARATIVE EXAMPLES 1 TO 4

The same procedures were performed as described in Example 1 to produce high-cis BR, excepting that the composition of the catalyst was defined as shown in Table 3 without addition of dialkylzinc as an agent for controlling the degree of branch.

TABLE 3

| | Catalyst Composition[1] | Catalyst Mole Ratio | SV/MV | SV (cps) | MV ($M_{1+4}$, 100° C.) | 1,4-cis Content (%) | Yield (%, 2 h) |
|---|---|---|---|---|---|---|---|
| 1 | Ni(naph)$_2$/ | 1:14:6 | 7.82 | 454 | 58.1 | 97.6 | 100 |
| 2 | $BF_3OBu_2$/ | 1:14:4 | 9.06 | 416 | 45.9 | 97.7 | 100 |
| 3 | $AlEt_3$/ | 1:14:3 | 6.38 | 227 | 35.6 | 97.8 | 96 |
| 4 | | 1:14:2 | 6.29 | 220 | 35.0 | 97.9 | 76 |

(Note)
[1]Ni(naph)$_2$: Ni(naphthenate)$_2$
Ni catalyst: $1.0 \times 10^{-4}$ mol/100 g (1,3-butadiene); Comparative Examples 1 to 4

From the results of Table 3, it is revealed that if the degree of branch was controlled based on the varied composition of the catalyst without dialkylzinc, there was a limitation in lowering the degree of branch below a predetermined value with a deterioration of the polymerization yield. By contrast, the present invention is characterized in that the ratio of solution viscosity to Mooney viscosity, which represents the degree of branch, can be easily controlled simply by adjusting the added amount of dialkylzinc without changing the composition of the Ziegler-Natta catalyst, while having no significant influence on the polymerization yield and the 1,4-cis content.

As described above in detail, the degree of branch of polybutadiene can be easily controlled to guarantee the optimum processability and physical properties of rubber in the present invention, in which high-cis BR is prepared via polymerization of 1,3-butadiene in the presence of the catalyst of the present invention as obtained by adding dialkylzinc as an agent for controlling the degree of branch of polybutadiene to a mixture of organo-nickel compound, boron trifluoride compound and organo-aluminum compound as a main catalyst and aging the catalyst.

What is claimed is:

1. A process for controlling the degree of branch of high 1,4-cis polybutadiene, in which 1,3-butadiene is polymerized in a non-polar solvent using a catalyst prepared by aging a mixture of organo-nickel compound, boron trifluoride ($BF_3$) compound and organo-aluminum compound with or without a conjugate diene compound, the process being characterized by adding to the mixture a dialkylzinc compound as an agent for controlling the degree of branch, said dialkylzinc compound being represented by the following formula

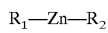

wherein $R_1$ and $R_2$ are same or different and include an alkyl group containing 1 to 5 carbon atoms.

2. The process according to claim 1, wherein the dialkylzinc compound represented by the formula I includes at least one compounds selected from the group consisting of dimethylzinc, diethylzinc, dipropylzinc, diisopropylzinc, dibutylzinc, diisobutylzinc, and dipentylzinc.

3. The process according to claim 1, wherein the dialkylzinc compound and the organo-nickel compound are mixed in a molar ratio of 0.5:1 to 10:1.

4. The process according to claim 2, wherein the dialkylzinc compound and the organo-nickel compound are mixed in a molar ratio of 0.5:1 to 10:1.

5. The process according to claim 1, wherein the organo-nickel compound includes at least one nickel carboxylic salts selected from the group consisting of nickel hexanoate, nickel heptanoate, nickel octanoate, nickel 2-ethylhexanoate, nickel naphthenate, nickel versatate, and nickel stearate.

6. The process according to claim 1, wherein the boron trifluoride compound includes at least one compounds selected from the group consisting of boron trifluoride dimethylether, boron trifluoride diethylether, boron trifluoride dibutylether, and boron trifluoride tetrahydrofuran.

7. The process according to claim 1, wherein the organo-aluminum compound includes at least one compounds selected from the group consisting of trimethylaluminum, triethylaluminum, tripropylaluminum, tributylaluminum, triisobutylaluminum, trihexylaluminum, trioctylaluminum, and diisobutylaluminum hydride.

8. The process according to claim 1, wherein the aging is performed in the temperature range from −20° C. to 60° C. for 5 minutes to 10 hours.

* * * * *